(12) United States Patent
Gailus et al.

(10) Patent No.: US 11,718,525 B2
(45) Date of Patent: Aug. 8, 2023

(54) SYSTEM AND METHOD OF PRODUCING CARBON NANOTUBES

(71) Applicant: Nanocomp Technologies, Inc., The Woodlands, TX (US)

(72) Inventors: David Gailus, Merrimack, NH (US); Mark Schauer, Merrick, NH (US)

(73) Assignee: Nanocomp Technologies, Inc., The Woodlands, TX (US)

( * ) Notice: Subject to any disclaimer, the term of this patent is extended or adjusted under 35 U.S.C. 154(b) by 108 days.

(21) Appl. No.: 17/599,006

(22) PCT Filed: Apr. 3, 2020

(86) PCT No.: PCT/US2020/026741
§ 371 (c)(1),
(2) Date: Sep. 28, 2021

(87) PCT Pub. No.: WO2020/206369
PCT Pub. Date: Oct. 8, 2020

(65) Prior Publication Data
US 2022/0144642 A1     May 12, 2022

Related U.S. Application Data

(60) Provisional application No. 62/828,981, filed on Apr. 3, 2019.

(51) Int. Cl.
*C01B 32/162*       (2017.01)
*B01J 31/12*         (2006.01)
(Continued)

(52) U.S. Cl.
CPC .......... *C01B 32/162* (2017.08); *B01J 23/745* (2013.01); *B01J 31/122* (2013.01); *B01J 38/02* (2013.01);
(Continued)

(58) Field of Classification Search
CPC ... C01B 32/162; C01B 32/158; C01B 32/159; C01B 32/16; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 23/745; B01J 31/122; B01J 38/02; B01J 38/16; B01J 38/48; B01J 38/60; B01J 31/2295; B01J 2531/842; B01J 21/185; D01F 9/133; D01F 9/127; D01F 13/00; D01F 9/12; D01F 9/1271; D01F 9/1272; D01F 9/1273; D01F 9/1274; D01F 9/1275; D01F 9/1276; D01F 9/1277;
(Continued)

(56) References Cited

U.S. PATENT DOCUMENTS 4,544,461 A   10/1985   Venkatesan et al.
7,993,620 B2   8/2011   Lashmore et al.
(Continued)

*Primary Examiner* — Daniel C. McCracken
(74) *Attorney, Agent, or Firm* — Nanocomp Technologies, Inc.; Lewis Craft; David K Wooten

(57) ABSTRACT

Method of producing short carbon nanotube fibers from a carbonaceous gas.

7 Claims, 2 Drawing Sheets

(51) Int. Cl.
*B01J 38/16* (2006.01)
*B01J 38/48* (2006.01)
*B01J 23/745* (2006.01)
*B01J 38/02* (2006.01)
*B01J 38/60* (2006.01)
*D01F 9/133* (2006.01)
*B82Y 40/00* (2011.01)

(52) U.S. Cl.
CPC ............... *B01J 38/16* (2013.01); *B01J 38/48* (2013.01); *B01J 38/60* (2013.01); *D01F 9/133* (2013.01); *B82Y 40/00* (2013.01); *C01P 2004/13* (2013.01); *C01P 2004/60* (2013.01); *C01P 2004/64* (2013.01)

(58) Field of Classification Search
CPC .... D01F 9/1278; B82Y 40/00; C01P 2004/13; C01P 2004/60; C01P 2004/64; C01P 2004/54; Y02P 70/62
See application file for complete search history.

(56) References Cited

U.S. PATENT DOCUMENTS

| | | | |
|---|---|---|---|
| 9,061,913 B2 * | 6/2015 | Lashmore | ............... B82Y 40/00 |
| 2007/0092431 A1 * | 4/2007 | Resasco | .................. D01F 9/127 |
| | | | 427/430.1 |
| 2009/0117025 A1 * | 5/2009 | Lashmore | ............. C01B 32/162 |
| | | | 977/891 |
| 2015/0071848 A1 | 3/2015 | Denton et al. | |
| 2015/0147261 A1 | 5/2015 | Denton et al. | |
| 2017/0101317 A1 | 4/2017 | Malaibari et al. | |

\* cited by examiner

SYSTEM AND METHOD OF PRODUCING CARBON NANOTUBES

CROSS REFERENCE TO RELATED APPLICATIONS

This application is a National Stage application filed under 35 U.S.C. § 371 of International Application No. PCT/US2020/026741 filed Apr. 3, 2020 which designated the United States, and which claims priority to U.S. Provisional Patent Application Ser. No. 62/828,981 filed Apr. 3, 2019. The noted applications are hereby incorporated herein by reference in their entirety.

STATEMENT REGARDING FEDERALLY SPONSORED RESEARCH OR DEVELOPMENT

Not applicable.

FIELD

The present disclosure generally relates to a system and methods of producing carbon nanotubes. More specifically, the present disclosure relates to a method of producing short carbon nanotube fibers having an aspect ratio around 25:1 to 500:1 and a length of about 1 mm to about 50 mm, or preferably about 25 mm.

BACKGROUND

Typically, methods of making carbon nanotube fibers try to have as close to laminar flow as possible to encourage the agglomeration of carbon nanotube to form very long fibers. At specific concentrations and in laminar flow, high aspect ratio carbon nanotubes grown by floating catalyst chemical vapor deposition tend to coalesce into to a low density mechanically connected network in which the tubes and tube bundles transfer load by a combination of entanglements and van der Waals forces. The network is essentially "inflated" with the carrier and byproduct gases of the reaction. For convenience one could call this solid/gas network an aerogel. While this spontaneous phenomenon is useful for forming continuous films and fibers, it also presents some challenges. Since the aerogel is fragile with limited plastic strain range, the characteristics of the output product are directly dependent on the production rate of a specific reactor. For instance, a tape formed by this method would have a mass per until length that is directly related to reactor production rate. Secondary operations can stretch, laminate or condense this tape, but only to a limited extent. As a result, a way to separate the production rate of the reactor to the product forming step is desirable. One way to achieve this is to form short fibers directly from the output of the chemical vapor deposition reactor before, during or after the aerogel formation

FIGURES

DETAILED DESCRIPTION

Figure 1A:
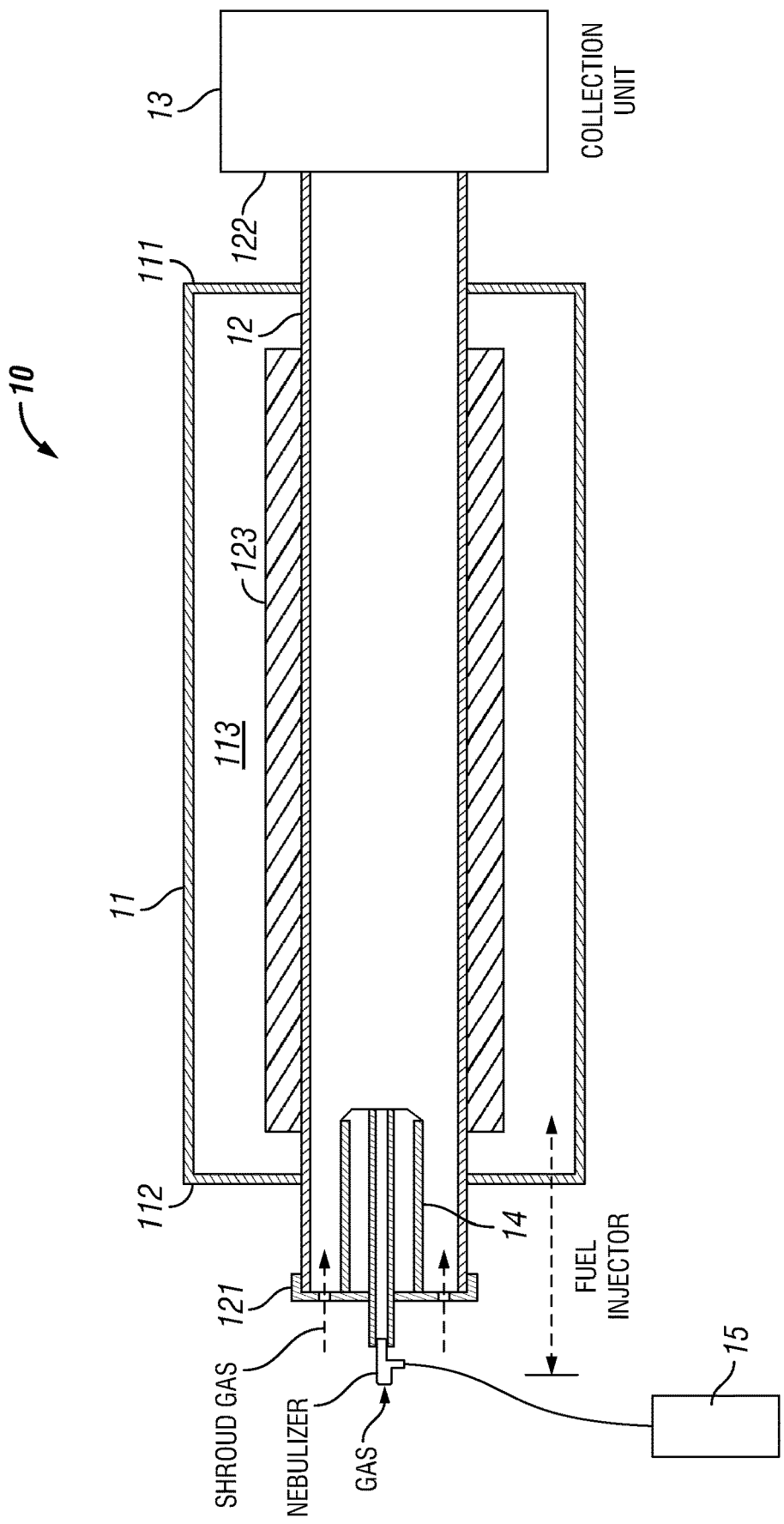
FIG. 1A illustrates a schematic diagram of a CVD system for production of carbon nanotubes.

Before explaining at least one embodiment of the present disclosure in detail, it is to be understood that the present disclosure is not limited in its application to the details of construction and the arrangement of components or steps or methodologies set forth in the following description. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference and to the extent that they do not contradict the instant disclosure.

All of the compositions and/or methods disclosed herein can be made and executed without undue experimentation in light of the present disclosure. While the compositions and methods of the present disclosure have been described in terms of embodiments or preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

Any of the embodiments herein referencing carbon nanotubes may also be modified within the spirit and scope of the disclosure to substitute other tubular nanostructures, including, for example, inorganic or mineral nanotubes. Inorganic or mineral nanotubes include, for example, silicon nanotubes, boron nanotubes, and carbon nanotubes having heteroatom substitution in the nanotube structure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of $100/1000$ are not to be considered as limiting since lower or higher limits may also produce satisfactory results.

In addition, the phrase "at least one of X, Y, and Z" will be understood to include X alone, Y alone, and Z alone, as well as any combination of X, Y, and Z. Likewise, the phrase "at least one of X and Y" will be understood to include X alone, Y alone, as well as any combination of X and Y. Additionally, it is to be understood that the phrase "at least one of" can be used with any number of components and have the similar meanings as set forth above.

The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCC, CBBAAA, CABBB, and so forth. The skilled artisan will understand that typically there is no limit on the number of items or terms in any combination, unless otherwise apparent from the context. In the same light, the terms "or combinations thereof" and "and combinations thereof" when used with the phrases "selected from" or "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

As used herein, the terms "% by weight", "wt %", "weight percentage", or "percentage by weight" are used interchangeably.

The term "flare gas", as used herein, refers to the mixture of gases that are produced during oil-gas production or from the operation of refineries, chemical plants, the coal industry, and landfills, and which are commonly burned or flared. The composition of flare gas is dependent on its source, but may comprise one or more of the following carbonaceous gases: methane, ethane, propane, n-butane, isobutane, n-pentane, isopentane, neo-pentane, n-hexane, ethylene, propylene, and 1-butene, as well as one or more other components such as carbon monoxide, carbon dioxide, hydrogen sulfide, hydrogen disulfide, hydrogen, oxygen, nitrogen, and water. It is possible that flare gas from oil-gas production sites mainly contains natural gas comprising more than 90% methane.

As used herein, "carbon nanotubes" are used to refer to single, double, and/or multiwall carbon nanotubes having a diameter of less than about 1 nm to about 20 nm and a length of 1 mm to 5 mm.

"Carbon nanotube fiber", as used herein, refers to a staple fiber comprising a number of carbon nanotubes that are interconnected such as to form a structure having a diameter in a range of from 0.1 to 10 microns and a length of about 150 mm to about 500 mm.

"Short carbon nanotube fiber", as used herein, refers to carbon nanotube fibers having a length of only about 1 mm to about 50 mm.

In one aspect, the present disclosure is directed to a method of producing carbon nanotubes comprising the steps of: (i) introducing a carbonaceous gas, a catalyst, and hydrogen into a reactor, wherein the reactor is at a temperature sufficient to decompose the carbonaceous gases (in the presence of the catalyst) into constituent atoms of the carbonaceous gases including carbon and hydrogen, (ii) permitting the carbon atoms of the carbonaceous gases to interact with the catalyst to produce carbon nanotubes; and (iii) collecting the carbon nanotubes.

A method of producing short carbon nanotube fibers, comprising: (A) introducing a mixture of a carbonaceous gas, a catalyst, and hydrogen into a reactor, wherein the reactor is at a temperature sufficient to decompose the carbonaceous gas in the presence of the catalyst into the constituent atoms of the carbonaceous gas, wherein the constituent atoms comprise carbon atoms and hydrogen atoms; (B) permitting the carbon atoms of the carbonaceous gas to interact with the catalyst to produce carbon nanotubes; (C) subjecting the carbon nanotubes to at least one of (i) one or more high velocity jets of gas, (ii) one or more spinning impellers, (iii) a gas flow across a textured surface, and/or (iv) one or more impacts with an array of blunt objects before exiting the reactor to form short carbon nanotube fibers having lengths in a range of from 1 mm to about 50 mm, or more preferably about 25 mm, and (D) collecting the short carbon nanotube fibers.

The carbonaceous gas may comprise at least one of (i) a treated or untreated flare gas, (ii) hydrocarbons such as methane, ethane, butane, and/or propane, (iii) natural gas, and/or (iv) other hydrocarbons like xylene, toluene, and benzene. Commercial grade natural gas primarily comprises methane and some ethane, propane, and butane. The amount of methane in commercial grade natural gas can range from 70 wt % to greater than 90 wt % of the natural gas.

In another aspect, the present disclosure is directed to a method of producing carbon nanotubes comprising the steps of: obtaining a flare gas comprising carbonaceous gases; treating the flare gas; introducing the flare gas, a catalyst, and hydrogen into a reactor, wherein the reactor is at a temperature sufficient to decompose the carbonaceous gases (in the presence of the catalyst) into constituent atoms of the carbonaceous gases including carbon and hydrogen; permitting the carbon atoms of the carbonaceous gases to interact with the catalyst to produce carbon nanotubes; and collecting the carbon nanotubes.

The flare gas may be obtained from an oil or gas production site, a refinery, a chemical plant, a coal plant, or landfill. In one embodiment, the system used to produce the carbon nanotubes is onsite at the oil or gas production site, refinery, chemical plant, coal plant, or landfill so that the flare gas can be obtained directly from the source and treated before being introduced into the reactor.

The step of treating the flare gas comprises subjecting the flare gas to one or more processes to remove excess hydrogen sulfide, hydrogen disulfide, carbon dioxide, and/or carbon monoxide therefrom. As used herein, "excess" is meant an amount sufficient to cause the flare gas to be considered sour gas and have detrimental impact on the ability to produce carbon nanotubes.

In one embodiment, excess hydrogen sulfide means an amount greater than 50 wt %, or an amount greater than 40 wt %, or an amount greater than 30 wt %, or an amount greater than 20 wt %, or an amount greater than 10 wt %, or an amount greater than 5 wt %, or an amount greater than 1 wt %, or an amount great than 0.1 wt % of the total weight of the flare gas.

Excess carbon dioxide means, in one embodiment, an amount greater than 50 wt %, or an amount greater than 40 wt %, or an amount greater than 30 wt %, or an amount greater than 20 wt %, or an amount greater than 10 wt %, or an amount greater than 5 wt %, or an amount greater than 1 wt %, or an amount greater than 0.1 wt % of the total weight of the flare gas.

Excess carbon monoxide means, in one particular embodiment, an amount greater than 50 wt %, or an amount greater than 40 wt %, or an amount greater than 30 wt %, or an amount greater than 20 wt %, or an amount greater than 10 wt %, or an amount greater than 5 wt %, or an amount greater than 1 wt %, or an amount greater than 0.1 wt % of the total weight of the flare gas.

Excess hydrogen disulfide means, in one particular embodiment, an amount greater than 50 wt %, or an amount greater than 40 wt %, or an amount greater than 30 wt %, or an amount greater than 20 wt %, or an amount greater than 10 wt %, or an amount greater than 5 wt %, or an amount greater than 10 wt %, or an amount greater than 0.1 wt % of the total weight of the flare gas.

In one particular embodiment, the treated flare gas contains (i) hydrogen sulfide in an amount less than 50 wt %, or an amount less than 40 wt %, or an amount less than 30 wt %, or an amount less than 20 wt %, or an amount less than 10 wt %, or an amount less than 5 wt %, or an amount less than 1 wt %, or an amount less than 0.1 wt % of the total weight of the flare gas, (ii) carbon dioxide in an amount less than 50 wt %, or an amount less than 40 wt %, or an amount less than 30 wt %, or an amount less than 20 wt %, or an amount less than 10 wt %, or an amount less than 5 wt %, or an amount less than 1 wt %, or an amount less than 0.1 wt % of the total weight of the flare gas, (iii) carbon monoxide in an amount less than 50 wt %, or an amount less than 40 wt %, or an amount less than 30 wt %, or an amount less than 20 wt %, or an amount less than 10 wt %, or an amount less than 5 wt %, or an amount less than 1 wt %, or an amount less than 0.1 wt % of the total weight of the flare gas, and/or (iv) hydrogen disulfide in an amount less than 50 wt %, or an amount less than 40 wt %, or an amount less than 30 wt %, or an amount less than 20 wt %, or an amount less than 10 wt %, or an amount less than 5 wt %, or an amount less than 1 wt %, or an amount less than 0.1 wt % of the total weight of the flare gas.

The step of treating the flare gas can comprise at least one of (i) electrochemically reducing at least a portion of the hydrogen sulfide to sulfur and thereafter removing such and (ii) oxidizing at least a portion of the hydrogen disulfide to sulfuric acid and removing such.

The step of treating the flare gas can alternatively or additionally include a process or system whereby at least a portion of the carbon monoxide and/or carbon dioxide are scrubbed from the flare gas. In one embodiment, a portion of the carbon monoxide and/or carbon dioxide can be scrubbed from the flare gas by contacting the flare gas with a solvent, including for example but without limitation an amine solvent, such that a portion of the carbon monoxide and/or carbon dioxide are absorbed into the solvent. However, a person of ordinary skill in the art will recognize that other processes for scrubbing the flare gas of carbon dioxide and/or carbon monoxide may exist and are within the scope of the present disclosure.

The temperature of the reactor can be in a range from 800° C. to greater than 1400° C., or from 800° C. to 1500° C., or from 900° C. to 1400° C., or from 1000° C. to 1400° C., or from 1100° C. to 1300° C., or about 1200° C. at atmospheric pressure.

In one embodiment, a portion of the carbonaceous gases in the reactor does not interact with the catalyst to form carbon nanotubes. This portion of carbonaceous gases is then separated and removed from the reactor and sent to a second reactor, optionally, with an additional amount of natural gas or treated or untreated flare gas.

An amount of the catalyst can also be collected from the reactor, and optionally reconditioned, and introduced into the second reactor with or without an amount of fresh (i.e., unused) catalyst.

In one embodiment, the catalyst is reconditioned by at least one of (i) oxidizing the catalyst in air and/or exfoliating the catalyst by electrochemical treatment, dissolving the catalyst in muriatic acid to form a chloride salt, and then reacting the chloride salt with sodium cyclopentadienide; and (ii) heating the catalyst to at least 2000° C. to vaporize the catalyst and then plate out the vaporized catalyst.

This process of taking unreacted carbonaceous gases from each reactor and combining it with new catalyst, reconditioned catalyst, and/or old catalyst in an additional reactor can be done one or more times.

In one particular embodiment, the hydrogen formed from the decomposition of the carbonaceous gas is separated and either collected for storage or resale, used as a fuel to heat the reactor, and/or introduced into another reactor.

In another embodiment, the carbon nanotubes formed in the reactor are subjected to (i) one or more high velocity jets of gas, (ii) one or more spinning impellers, (iii) a gas flow across a textured surface, and/or (iv) impact with an array of blunt objects before exiting the reactor such that the carbon nanotubes tend to form short carbon nanotube fibers having lengths in a range of from 1 mm to about 50 mm, or from 1 mm to about 40 mm, or from 1 mm to about 30 mm, or from about 5 mm to about 50 mm, or from about 10 mm to about 50 mm, or from about 15 mm to about 45 mm, or from about 20 mm to about 40 mm, or from about 20 mm to about 30 mm, or about 25 mm.

In some embodiments, the short carbon nanotube fiber can have an aspect ratio in a range of from about 25:1 to 5000:1, or 25:1 to 4000:1, or 25:1 to 3000:1, or 25:1 to 2000:1, or 25:1 to 1000:1, or 25:1 to 500:1, or 30:1 to 500:1, or 50:1 to 250:1.

Typically, methods of making carbon nanotube fibers try to have as close to laminar flow as possible to encourage the agglomeration of carbon nanotube to form very long fibers. It has been discovered that subjecting the carbon nanotubes to gas streams and other interruptions in the ability of the carbon nanotubes to agglomerate (e.g., contact with spinning impellers or impact with blunt objects) allows for the formation of short carbon nanotube fibers that are useful in making dispersions and other products suitable with short carbon nanotube fibers.

The short carbon nanotube fibers can be transported and collected by conventional pneumatic conveyance and concentrated in a filter or cyclonic separator. These short fibers can then be used as a structural additive or as an intermediate product to form sheets, tapes or other product formats. If the fibers have sufficient aspect ratio and adequate interaction with matrix material, there is minimal structural penalty over continuous film or fiber, but substantial benefit for manufacturing flexibility.

The method of producing carbon nanotubes may further comprise aspects of the method and system set forth in U.S. Pat. Nos. 7,993,620 and 9,061,913, which are hereby incorporated by reference in its entirety.

In particular, the method may comprise using a system 10, as illustrated in FIG. 1A, which includes, in one embodiment, a housing 11 (i.e., furnace) having opposite ends 111 and 112, and a passageway 113 extending between ends 111 and 112. A tube 12 (i.e., reactor) within which extended length nanostructures may be generated, may be situated within the passageway 113 of housing 11. As shown in FIG. 1A, ends 121 and 122 of tube 12 may be positioned so that they extend from ends 111 and 112 respectively of housing 11. Housing 11, in an embodiment, may including heating elements or mechanisms (not shown) to generate temperature ranging up to from about 1100° C. to about 1500° C., necessary for the growth of carbon nanostructures within tube 12. As the heating elements must maintain the temperature environment within tube 12 to within a specified range during the synthesis of the extended length nanostructures, although not illustrated, the system 10 may be provided with a thermocouple on the exterior of tube 12 to monitor the temperature environment within tube 12. In an embodiment, the maintenance of the temperature range within tube 12, e.g., from about 1000° C. to about 1400° C., may be optimized by the use of an insulating structure 123. Insulating structure 123, in one embodiment, may be made from, for example, zirconia ceramic fibers (e.g., zirconia-stabilized boron nitride). Other insulating materials may, of course, also be used.

As the housing 11 and tube 12 must withstand variations in temperature and gas-reactive environments, housing 11 and tube 12 may be manufactured from a strong, substantially gas-impermeable material that is substantially resistant to corrosion. In an embodiment, the housing 11 and tube 12 may be made from a quartz material. Of course, other materials may be used, so long as the housing 11 and tube 12 can remain impermeable to gas and maintain their non-corrosive character. Also, although illustrated as being cylindrical in shape, housing 11 and tube 12 may be provided with any geometric cross-section.

System 10 may also include a collection unit 13 in fluid communication with end 122 of tube 12 for collecting nanostructures generated from within tube 12. At opposite 121 of tube 12, system 10 may include an injector apparatus 14 (i.e., nebulizer) in fluid communication with tube 12. Injector 14, in an embodiment, may be designed to receive from a reservoir 15 a fluid mixture of components necessary for the growth of nanostructures within tube 12. Injector 14 may also be designed to vaporize or fluidize the mixture (i.e., generating small droplets) before directing the mixture into tube 12 for the generation and growth of nanostructures.

The fluid mixture, in one embodiment, can include, among other things, (a) a catalyst precursor (i.e., the catalyst) from which a catalyst particle can be generated for subsequent growth of the nanostructure thereon, (b) a conditioner compound for controlling size distribution of catalyst particles generated from the catalyst precursor, and thus the diameter of the nanostructure, and (c) a carbonaceous source (including, e.g., (i) a treated or untreated flare gas, (ii) methane, ethane, butane, and/or propane, (iii) natural gas, and/or (iv) other hydrocarbons like xylene, toluene, and benzene) for depositing carbon atoms onto the catalyst particle in order to grow the nanostructures.

Examples of the catalyst precursor from which catalyst particles may be generated includes Ferrocene, materials such as iron, iron alloy, nickel or cobalt, their oxides, or their alloys (or compounds with other metals or ceramics). Alternatively, the catalyst particles may be made from metal oxides, such as $Fe_3O_4$, $Fe_2O_4$, or $FeO$, or similar oxides of cobalt or nickel, or a combination thereof.

Examples of a conditioner compound for use in connection with the fluid mixture of the present invention include Thiophene, $H_2S$, other sulfur containing compounds, or a combination thereof.

Examples of a carbon source for use in connection with the fluid mixture of the present disclosure include, but not limited to, treated or untreated flare gas, ethanol, methyl formate, propanol, acetic acid, hexane, methanol, or blends of methanol with ethanol. Other liquid carbon source may also be used, including $C_2H_2$, $CH_3$, and $CH_4$.

Figure 1B:
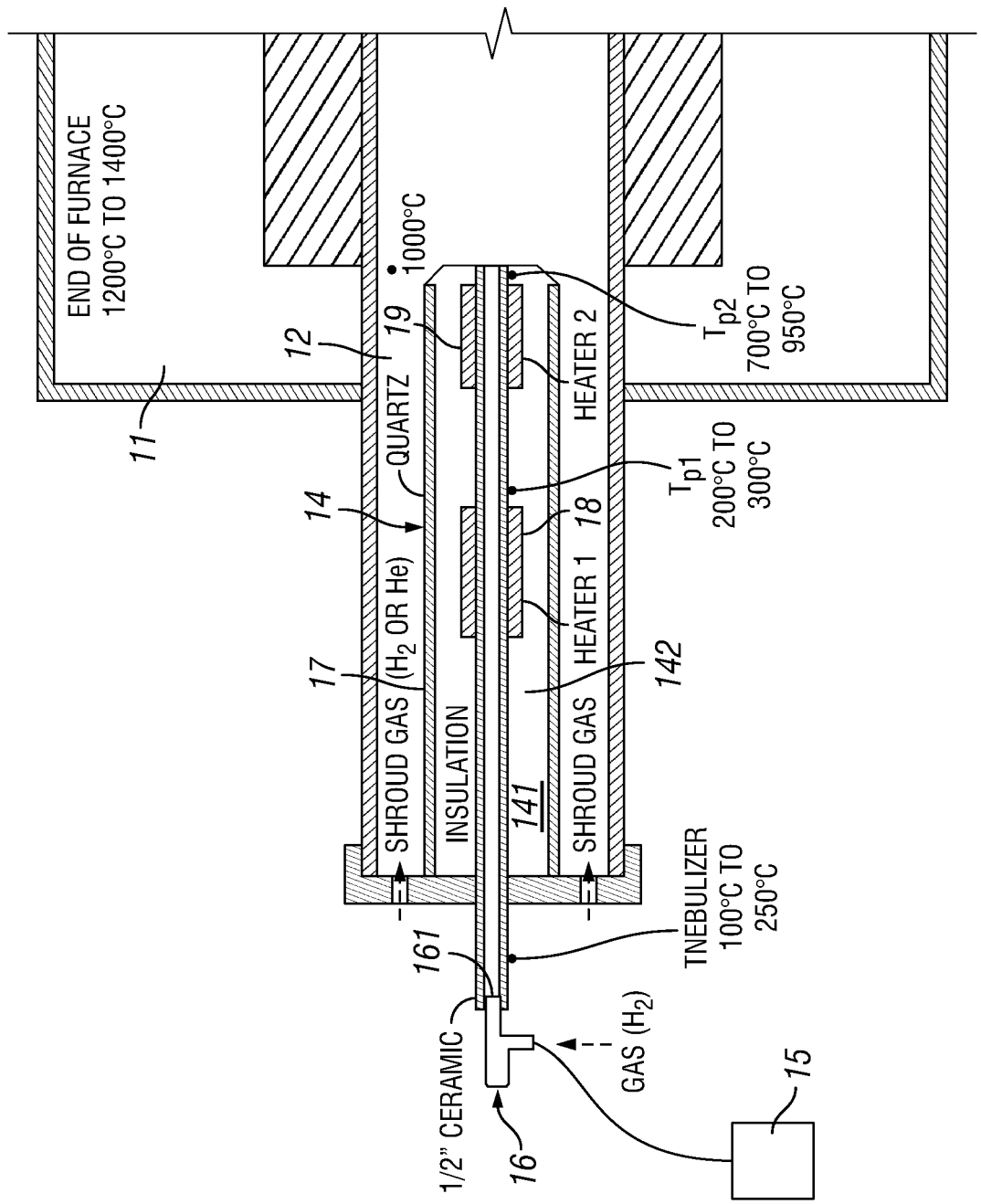
FIG. 1B illustrates a schematic illustration of an injector apparatus for use in connection with the CVD system illustrated in FIG. 1A.

Looking now at FIG. 1B, there is shown a detail illustration of injector 14. Injector 14, in one embodiment, includes a substantially tubular chamber 141 defining a pathway 142 along which the vaporized fluid mixture may be generated and directed into reactor tube 12. To vaporize or fluidize the mixture, injector 14 may include a nebulizing tube 16 designed to impart a venturi effect in order to generate small droplets from the fluid mixture being introduced from reservoir 15. It should be appreciated that, in one embodiment, the vaporizing or fluidizing of the fluid mixture occurs substantially as the fluid exits through distal end 161 of nebulizing tube 16. In an embodiment, the droplets being generated may range from nanoscale in size to microscale in size. To direct the vaporized fluid mixture along the nebulizing tube 16 into the reactor tube 12, in one embodiment, a volume of gas, such as $H_2$, He or any other inert gases, may be used to push the vaporized fluid toward the reactor tube 12.

Although illustrated as substantially tubular, it should be appreciated that injector 14 may be provided with any geometric designs, so long as the injector can accommodate the nebulizing tube 16, and provide a pathway along which the vaporized fluid mixture can be directed into a reactor tube 12.

In addition, it should be noted that the injector 14 of the present disclosure may be designed to permit introduction of individual components of the fluid mixture into the injector 14 rather than providing them as part of the fluid mixture. In such an embodiment, each component may be individually vaporized, through a nebulizing tube similar to tube 16, and introduced into the injector 14, where they may be allowed to mix and subsequently directed along the injector 14 in a similar manner to that described above.

As injector 14 is situated within a portion of reactor tube 12 and furnace 11, the heat being generated within tube 12 and furnace 11 may have a negative effect on the temperature environment within injector 14. In order to shield injector 14 from the heat in reactor tube 12 and furnace 11, an insulation package 17 may be provided about injector 14. In particular, insulation package 17 may act to preserve the temperature environment along the length of injector 14.

With the presence of insulation package 17, the temperature environment within injector 14 may be lowered to a range which can affect the various reactions necessary for growing nanostructures. To that end, injector 14 may also include a heating zone A situated downstream from the nebulizing tube 16 to provide a temperature range sufficient to permit the formation of catalyst particles from the catalyst precursors. In one embodiment, the heating zone A includes a first heater 18 situated downstream of the distal end 161 of nebulizing tube 16. Heater 18 may be provided to maintain a temperature range at, for instance, Tp1 necessary to decompose the catalyst precursor into its constituent atoms, and which atoms may thereafter cluster into catalyst particles on which nanostructures may subsequently be grown. In order to maintain the temperature range at Tp1 at a level necessary to decompose the catalyst precursor, heater 18, in one embodiment, may be situated slightly downstream of Tp1. In an embodiment where Ferrocene is used as a precursor, its constituent atoms (i.e., iron particles), substantially nanoscaled in size, may be generated when the temperature at Tp1 can be maintained in a range of from about 200° C. to about 300° C.

Heating zone A may further include a second heater 19 positioned downstream of first heater 18, and within furnace 11. Heater 19 may be provided to maintain a temperature range at, for example, Tp2 necessary to decompose the conditioner compound into its constituent atoms. These atoms, in the presence of the clusters of catalyst particles, can interact with the clusters to control the size distribution of the catalyst particles, and hence the diameter of the nanostructures being generated. In an embodiment wherein Thiophene is used as a conditioning compound, sulfur may be released upon decomposition of the Thiophene to interact with the clusters of catalyst particles. Heater 19, in an embodiment, may be designed to maintain a temperature range at Tp2 from about 700° C. to about 950° C. and to maintain such a range at a location slightly downstream of the heater 19.

In accordance with one embodiment of the present invention, Tp2 may be may be located at a desired distance from Tp1. As various parameters can be come into play, the distance from Tp1 to Tp2 should be such that the flow of fluid mixture from Tp1, where decomposition of the catalyst precursor occurs, to Tp2 can optimize the amount of decomposition of the conditioning compound, in order to optimize the size distribution of the catalyst particles.

It should be appreciated that in addition to the particular temperature zones generated by first heater 18 and second heater 19 within injector 14, the temperature at the distal end 161 of nebulizing tube 16 may also need to be maintained within a particular range in the injector 14 in order to avoid either condensation of the vaporized fluid mixture or uneven flow of the fluid mixture as it exits through distal end 161 of nebulizing tube 16. In an embodiment, the temperature at the distal end 161 may need to be maintained between about 100° C. and about 250° C. If, for example, the temperature is below the indicated range, condensation of the fluid mixture may occur along a wall surface of the injector 16. Consequently, the fluid mixture that is directed from the injector 16 into the reactor tube 12 may be substantially different from that of the mixture introduced from reservoir 15. If, for example, the temperature is above the indicated range, boiling of the fluid mixture may occur at the distal end 161, resulting in sputtering and uneven flow of the fluid into the injector 14.

As injector 14 may need to maintain a temperature gradient along its length, whether to minimize condensation of the distal end 161 of the nebulizing tube 16, to maintain the necessary temperature at Tp1 to permit decomposition of the catalyst precursor, or at Tp2 to permit decomposition of the conditioning compound, insulation package 17, in addition to shielding heat from the reactor tube 12 and furnace 11, can act to maintain the desired temperature gradient along injector 14 at each critical location. In one embodiment, the insulation package 17 may be made from quartz or similar materials, or from a porous ceramic material, such as zirconia ceramic fibers (e.g., zirconia-stabilized boron nitride). Other insulating materials may, of course, also be used.

In one embodiment, the system 10 is designed such that the fluid mixture exiting the distal end 161 may be introduced into the injector of a second system.

The system 10 is further designed so that either a flow of gas or other means disrupts the carbon nanotubes after formation to prevent significant agglomeration, thereby resulting in short carbon nanotube fibers.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A method of producing short carbon nanotube fibers, comprising:
   (i) introducing a carbonaceous gas, a catalyst, and hydrogen into a reactor, wherein the reactor is at a temperature sufficient to decompose the carbonaceous gas in the presence of the catalyst into the constituent atoms of the carbonaceous gas, wherein the constituent atoms comprise carbon atoms and hydrogen atoms;
   (ii) permitting the carbon atoms of the carbonaceous gas to interact with the catalyst to produce carbon nanotubes;
   (iii) subjecting the carbon nanotubes to at least one of (a) one or more high velocity jets of gas, (b) one or more spinning impellers, (c) a gas flow across a textured surface, and/or (d) one or more impacts with an array of blunt objects before exiting the reactor to form short carbon nanotube fibers having lengths in a range of from 1 mm to about 50 mm, and
   (iv) collecting the short carbon nanotube fibers.

2. The method of claim 1, wherein the catalyst is ferrocene.

3. The method of claim 1, wherein a portion of the carbonaceous gas does not react with the catalyst to form carbon nanotubes and such portion is sent to a second reactor, optionally, with an additional amount of carbonaceous gas.

4. The method of claim 1, wherein an amount of the catalyst is collected and then reconditioned and either (i) introduced into the second reactor, optionally, with an amount of fresh catalyst, or (ii) stored for later use.

5. The method of claim 4, wherein the catalyst is reconditioned by at least one of (i) oxidizing the catalyst in air and/or exfoliating the catalyst by electrochemical treatment, dissolving the catalyst in muriatic acid to form a chloride salt, and then reacting the chloride salt with sodium cyclopentadienide; and (ii) heating the catalyst to at least 2000° C. to vaporize the catalyst and then plate out the vaporized catalyst.

6. The method of claim 1, wherein the hydrogen formed from the decomposition of the carbonaceous gas is separated and either collected for storage or resale, used as a fuel to heat the reactor, and/or introduced into another reactor.

7. The method of claim 1, wherein the short carbon nanotube fibers have an aspect ratio in a range of from about 25:1 to 500:1.

* * * * *